July 10, 1951  H. G. FAY  2,559,860

MOLD FOR CENTERING LENSES IN PLASTIC MOUNTINGS

Filed Jan. 28, 1950

HOWARD G. FAY
INVENTOR

Daniel J. Mayne
BY Walter O. Hodgdon
ATTORNEYS

Patented July 10, 1951

2,559,860

UNITED STATES PATENT OFFICE 2,559,860

MOLD FOR CENTERING LENSES IN PLASTIC MOUNTINGS

Howard G. Fay, Rochester, N. Y., assignor to Eastman Kodak Company, Rochester, N. Y., a corporation of New Jersey Application January 28, 1950, Serial No. 141,060

5 Claims. (Cl. 18—36)

This invention relates to apparatus for optically centering lenses and forming mountings on such optically centered lenses, and more particularly to an improved injection-type mold which is adaptable for molding a plastic mounting onto a lens which the mold has very accurately optically centered by automatically imparting a rotation to the lens as the mold is closing.

For many years it was the practice to center optical lenses by grinding the periphery of the lens, or mirror, in a lathe to make its optical center coincide with its geometrical center. In some cases slight errors were introduced due to the difficulty of properly aligning the lens in the lathe under sufficient pressure to withstand the grinding action.

The lens centering technique and the molding of mountings on optically centered lenses were greatly advanced by the provision of methods and apparatus disclosed in Wood Patent 2,304,984 of December 15, 1942, and Simmons Patent 2,259,006 of October 14, 1941.

These patents describe lens centering techniques and apparatus including an injection-type mold having lens centering zonal clamping members positioned in the mold. The zonal clamps engage the lens on either side. The difference in thickness of any lens between its paraxial and marginal zones will, as the clamps are applied, cause the lens to slide to the position wherein its optic axis is centered in the clamp. Even a one-dioptic spectacle lens which, of course, has very little differential in thickness over its area, will repeatedly center itself in the zonal clamps within one-thousandth of an inch as they exert an optimum pressure on the lens. Mention is also made in these patents that the zonal clamps may be vibrated or rotated to enhance the accuracy of the centering operation. This additional movement eliminates the effect of the slight friction which exists between the lens being centered and the clamping member. The theory of the operation of such zonal clamps is discussed at some length in the above-mentioned patents and need not be repeated herein.

As will be apparent from a reading of these patents, no provision is made in the mold there described for rotating the clamping members so that this desirable final centering correction could be made automatically. Accordingly, any rotational adjustment was usually made manually by an operator placing his fingers within the mold and turning one or both of the zonal clamping members. This was found to be hazardous and time consuming, particularly in the case of a multiple cavity mold, as well as unreliable. The need of a lens centering injection mold having provision for automatically rotating the lens clamps thus became apparent.

An object of the present invention, therefore, is an injection mold which is adapted for molding a mounting on the periphery of a lens, the mold being provided with lens-centering clamping members, at least one of which is automatically rotatable as the mold closes to center the lens more accurately by correcting for frictional resistance between the clamps and the lens.

Other objects and advantages of the present invention will be more fully understood from the following description when read in connection with the accompanying drawing in which.

Figure 1:
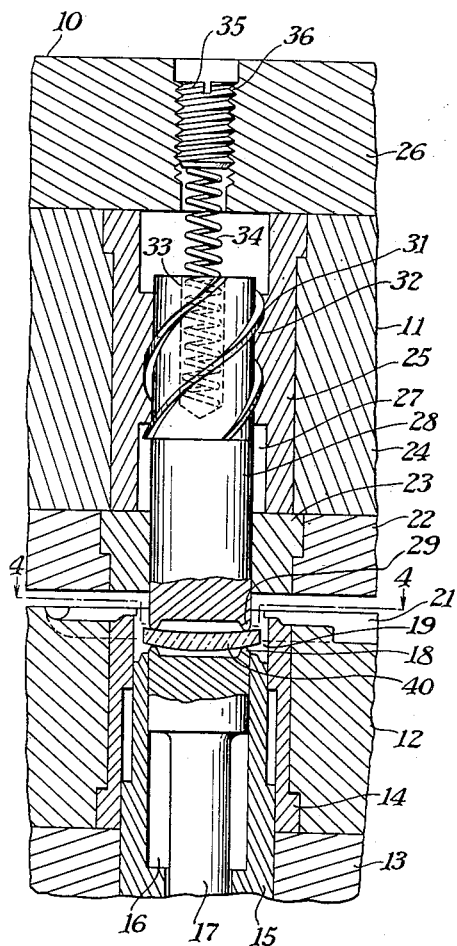
Fig. 1 is an elevational view partly in section of one embodiment of the injection mold of the invention showing the mold partly open and a lens therein being centered.

Referring to Fig. 1 there is shown an injection mold 10 comprising an upper mold block 11 and a lower mold block 12 one or both of which may be moved into engagement with the other as by the usual hydraulic pistons of an injection molding machine, not shown. Lower mold block 12 is made of associated mold parts 13, 14 and 15, the latter defining a piston cylinder 16 in which piston 17 is free to move in a vertical direction. The piston 17 may be moved by any suitable means, not shown, as will be evident to those familiar in this art, the method of movement not constituting a part of this invention. The face of piston 17 has an integral ring thereon which constitutes the lower zonal clamp 18. The face of piston 17 and the zonal clamp 18 together with cooperating mold parts 14 and 15, define the sides and bottom of mold cavity 19. The lower mold block 12 contains mold gates or runners 21 through which a molding composition can be injected into the mold cavity 19. The closure for the top of the mold cavity 19 will be described subsequently, although quite evident from the drawing.

The upper mold block 11 comprises mold parts 22, 23, 24, 25 and 26. Parts 23 and 25 define, in effect, a cylinder 27 through which piston 28 moves into and out of mold cavity 19. The face of piston 28 has an integral ring thereon which constitutes the upper zonal lens clamp 29. When the upper and lower mold blocks 11 and 12 are forced against each other, the lower face of mold block 11 and zonal clamp 29 constitute the top closure for the mold cavity 19.

It will be observed that the barrel of piston 28 is provided with a threaded portion 31 which engages a complementary threaded portion 32 of the wall of the cylinder formed in mold part 25. A recess 33 is formed in the upper end of the piston 28 and a spring 34 is mounted therein and pushes against the piston at the bottom of recess 33. The other end of the spring 34 is attached to screw 35 which is positioned in tapped hole 36 of mold part 26. The spring 34 becomes compressed when the mold is closed.

Figure 2:
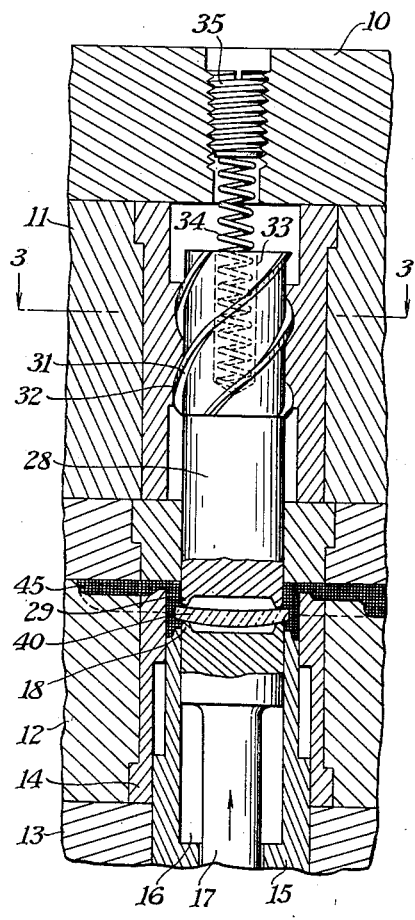
Fig. 2 is a similar view of the mold in which the mold is completely closed and a plastic composition has been injected around the finally centered lens.

The operation of my novel lens-centering injection mold will now be further described. Mold blocks 11 and 12 would be suitably attached to the respective faces of pistons of a molding machine which are adapted to open and close injection molds, and would be moved apart sufficiently so that lens 40, which itself may be made of a plastic, or glass, could be placed on zonal lens clamp member 18. The upper mold block 11 would then be lowered until zonal clamp member 29 engages the upper surface of lens 40. At this point the relationship of the parts of the mold would be about as represented in Fig. 1. The pressure of zonal clamps 18 and 29 on the lens 40 would cause it to move so that it is substantially at its optical center in the mold cavity 19. As the mold continues to close piston 28 will be made to turn as the threaded member 25 is forced downwardly in respect to the threads on piston 28. The turning of piston 28 will rotate the lens 40 and will overcome any tendency of the lens not to assume its center position due to friction between the lens and the zonal clamping members 18 and 29. The optimum degree of rotation can be determined for the particular lens being centered. Generally the rotation will be through a relatively small angle. When the mold is completely closed and held under satisfactory pressure, the injection of the hot plastic composition 45 takes place in the usual manner, and the plastic fills the mold as shown in Fig. 2. After the plastic is hardened as is customary by cooling, the mold blocks 11 and 12 are again separated and the optically centered lens held in position by its plastic mounting is removed from the mold cavity. The periphery of the molded rim will be centered on the optic axis of the lens. Undesired flash on the mounting could be removed by usual methods. As the upper mold block 11 becomes disengaged from the lower mold block 12, the piston 28 becomes free to move and the compressed spring 34 pushes it and causes it to rotate out of its cylinder so that it is restored to a position corresponding to about that shown in Fig. 1, and where it is again in position to be turned by the mold-closing operation when another lens is to be centered.

Figure 3:
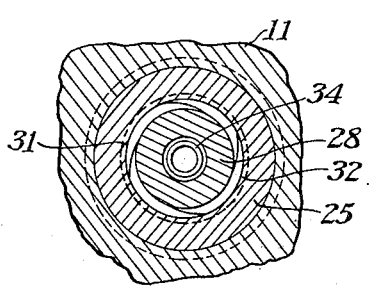
Fig. 3 is a cross sectional view taken on the lines 3—3 of Fig. 2.
Figure 4:
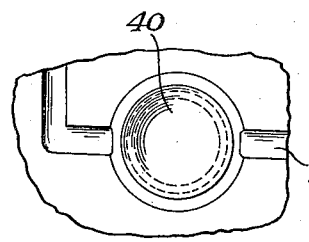
Fig. 4 is a view of the mold cavity and gates taken on the line 4—4 of Fig. 1.

The position of the parts of the mold will be further apparent by reference to Fig. 3 and Fig. 4.

While only a single cavity mold has been described, it is obvious that a multiple cavity mold could be assembled which would incorporate my novel mold structure as respects one or more mold cavities.

It will be understood the periphery of the lens and/or the molded mounting may be of any shape which has a center such as a circle, an ellipse, a square, a rectangle or even a triangle, although the commonest forms are, of course, a circle and a rectangle.

During all subsequent operations or applications to which the lens centered in the plastic mounting is put, it can be handled in the same manner as the lens which is centered by grinding and has the additional advantage of having a plastic rim which may have any predetermined outline and shape according to the mold used.

My novel mold may be employed to mold optically centered rims on all lenses either positive or negative, compound or simple. Various plastic compounds may be employed to form the lens mounting such as thermoplastic or thermosetting resins. Cellulose ester compositions such as cellulose acetate may be employed advantageously as can the various glasslike acrylate and methacrylate resins.

What I claim and desire to secure by Letters Patent of the United States is:

1. In an injection mold adapted to be opened and closed and adapted to optically center an uncentered lens in the mold and to mold a peripheral mounting onto said optically centered lens, the combination in a mold having a plurality of movable parts adapted to define a mold cavity with means for holding a lens comprising two members of a clamp for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable axially whereby a clamped lens will move laterally under a clamp pressure until the optic axis is approximately concentric with the contacting surfaces, of means for automatically rotating one of said clamping members, in one direction when the mold is being closed and after clamping pressure is exerted on the lens whereby the lens is more accurately centered, and means for rotating said one member in the opposite direction after the mold has been opened and the clamping pressure on the lens then molded into a mounting, has been released.

2. In an injection mold adapted to be opened and closed and adapted to optically center an uncentered lens in the mold and to mold a peripheral mounting onto said optically centered lens, the combination in a mold having a plurality of movable parts adapted to define a mold cavity with means for holding a lens comprising two members of a clamp for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable axially whereby a clamped lens will move laterally under a clamping pressure until the optic axis is approximately concentric with the contacting surfaces, of means for automatically rotating one of said clamping members, in one direction when the mold is being closed and after clamping pressure is exerted on the lens whereby the lens is more accurately centered, and means including a spring for rotating said one member in the opposite direction after the mold has been opened and the clamping pressure on the lens, then molded into a mounting, has been released.

3. In an injection mold adapted to be opened and closed and adapted to optically center an uncentered lens in the mold, and to mold a peripheral mounting onto said optically centered lens, the combination in a mold having a plurality of movable parts adapted to define a mold cavity with means for holding a lens comprising two members of a clamp for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable axially whereby a clamped lens will move laterally under a clamping pressure until the optic axis is approximately concentric with the contacting surfaces, of means having coacting threaded surfaces for automatically rotating one of said clamping members, in one direction when the mold is being closed and after clamping pressure is exerted on the lens whereby the lens is more accurately centered, and means including a spring cooperating with said first means for rotating said one member in the opposite direction after the mold has been opened and the clamping pressure on the lens, then molded into a mounting, has been released.

4. In an injection mold adapted to be opened and closed and adapted to optically center an uncentered lens in the mold and to mold a peripheral mounting onto said optically centered lens a plurality of movable parts adapted to define a mold cavity, a clamp comprising two clamping members for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable axially whereby a clamped lens will move laterally under a clamping pressure until the optic axis is approximately concentric with the contacting surfaces, a threaded member in said mold, one of said clamping members having a threaded surface thereon in engagement with said first-mentioned threaded member and when the mold is being closed adapted to cause the rotation of said one clamping member after clamping pressure is exerted on the lens, whereby the lens is more accurately centered, and a spring associated with one clamping member adapted to exert a force thereon in a direction toward the lens, during said rotation, and to cause rotation of the one clamping member in the opposite direction after the mold has been opened and the clamping pressure on the lens, then molded into a mounting, has been released.

5. In an injection mold adapted to be opened and closed and adapted to optically center an uncentered lens in the mold and to mold a peripheral mounting onto said optically centered lens a plurality of movable parts adapted to define a mold cavity, a clamp comprising two clamping members for clamping opposite faces of the lens symmetrically about the optic axis of the lens, each member having a smooth circular contacting surface of small radius of curvature in section whereby substantially a circumferential line contact is obtained with the surface of the lens, the circular contacting surfaces being concentric, parallel and movable axially whereby a clamped lens will move laterally under a clamping pressure until the optic axis is approximately concentric with the contacting surfaces, a threaded member in said mold, one of said clamping members having a threaded surface thereon in engagement with said first-mentioned threaded member and when the mold is being closed adapted to cause the rotation of said one clamping member after clamping pressure is exerted on the lens, whereby the lens is more accurately centered, and a spring attached to said one clamping member adapted to be compressed when the mold is closed and exert a force on the clamping member in a direction toward the lens during said rotation and to expand and cause rotation of the one clamping member in the opposite direction after the mold has been opened and the clamping pressure on the lens, then molded into a mounting, has been released.

HOWARD G. FAY.

REFERENCES CITED

The following references are of record in the file of this patent:

UNITED STATES PATENTS

| Number | Name | Date |
|---|---|---|
| 2,304,984 | Wood | Dec. 15, 1942 |